(12) United States Patent
Rose et al.

(10) Patent No.: US 6,333,812 B1
(45) Date of Patent: Dec. 25, 2001

(54) BORESCOPE

(75) Inventors: Gary Martin Rose; Christopher Ian Collins, both of Essex (GB)

(73) Assignee: Keymed (Medical & Industrial Equipment) Ltd., Essex (GB)

(*) Notice: Subject to any disclaimer, the term of this patent is extended or adjusted under 35 U.S.C. 154(b) by 0 days.

(21) Appl. No.: 09/367,344

(22) PCT Filed: Dec. 9, 1998

(86) PCT No.: PCT/GB97/03665

§ 371 Date: Aug. 12, 1999

§ 102(e) Date: Aug. 12, 1999

(87) PCT Pub. No.: WO99/56165

PCT Pub. Date: Nov. 4, 1999

(30) Foreign Application Priority Data

Apr. 24, 1998 (GB) .................................................. 9808803

(51) Int. Cl.[7] ................................ A61B 1/00; G02B 23/00
(52) U.S. Cl. ...................... 359/367; 359/399; 359/424; 359/428
(58) Field of Search .................... 359/367, 399, 359/424, 431, 427–429, 819, 434–435, 503–506; 33/233, 297, 245–250; 42/101, 103; 356/241, 247, 251–252

(56) References Cited

U.S. PATENT DOCUMENTS

| | | | |
|---|---|---|---|
| 2,828,669 | * 4/1958 | Peckham ............................ | 359/367 |
| 2,909,964 | * 10/1959 | Keuffel et al. ..................... | 359/424 |
| 3,614,238 | * 10/1971 | Stites ................................... | 356/124 |
| 4,046,463 | * 9/1977 | La Russa et al. .................. | 351/208 |
| 4,669,833 | * 6/1987 | Mise ................................... | 359/428 |
| 4,721,375 | * 1/1988 | Van Dulmen ....................... | 359/428 |
| 5,170,775 | 12/1992 | Tagami ................................ | 128/4 |
| 5,243,399 | 9/1993 | Koop et al. ........................ | 356/153 |

FOREIGN PATENT DOCUMENTS

| | | | |
|---|---|---|---|
| 1260181 | * 2/1968 | (DE) .................................... | 359/367 |
| 0350603 | 1/1990 | (EP) . | |
| 0636915 | 2/1995 | (EP) . | |
| 954629 | 4/1964 | (GB) . | |

* cited by examiner

Primary Examiner—Thong Nguyen
(74) Attorney, Agent, or Firm—Smith, Gambrell & Russell, LLP

(57) ABSTRACT

An orbital scanning borescope includes a tube insertable into an inaccessible location in use and an optical system for gathering an image of a feature and transmitting the image to a viewing device located in a housing at the proximal end of the tube. The tube is rotatable about its longitudinal axis relative to the housing. The viewing device includes an ocular lens and a reticle both of which are rotatable relative to the tube. Therefore, the tube can be rotated until a desired feature can be viewed through the borescope. The reticle can then be rotated independently of the tube until it is aligned as appropriate with the feature of interest.

15 Claims, 1 Drawing Sheet

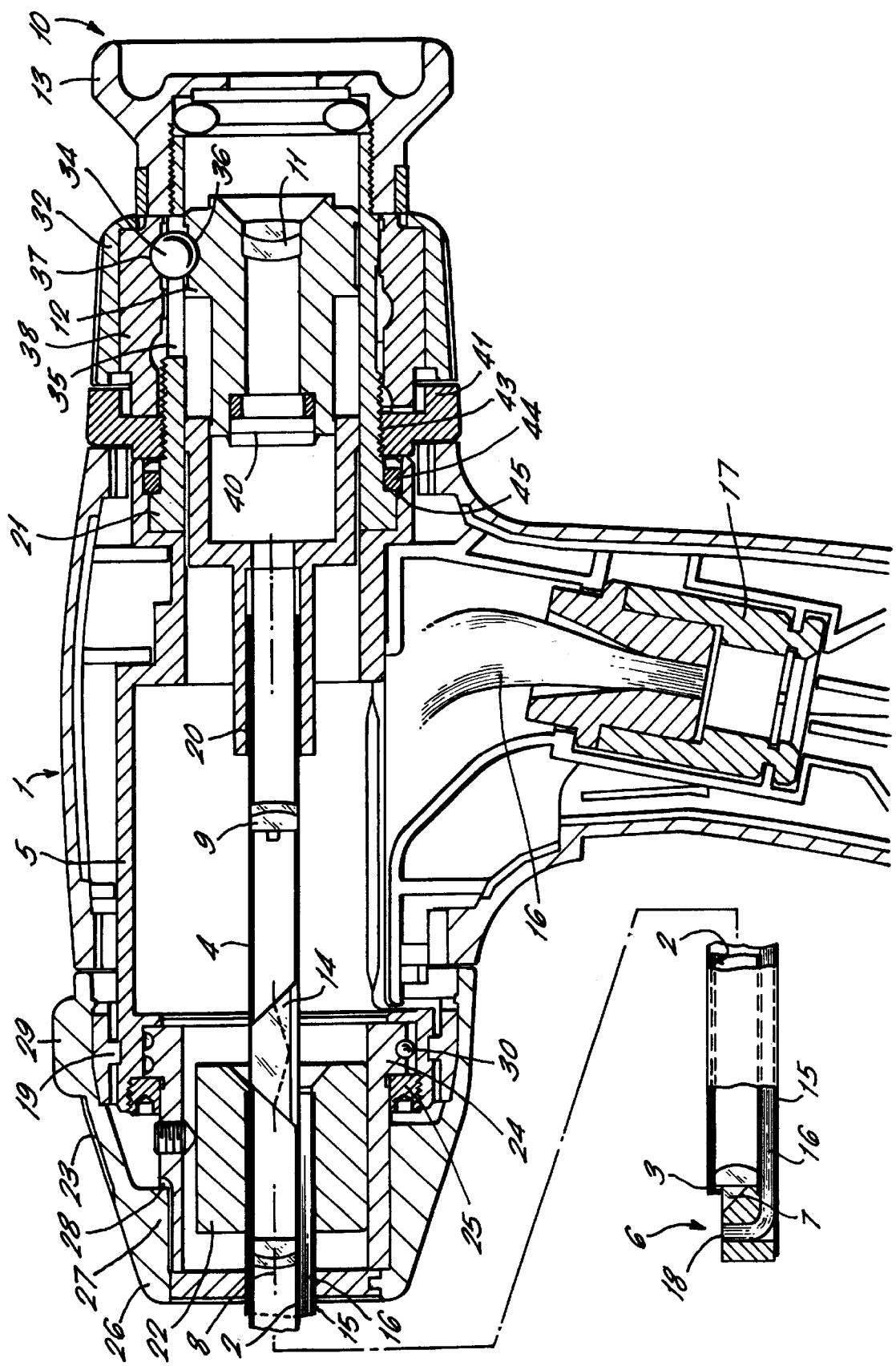

BORESCOPE

BACKGROUND OF THE INVENTION

The present invention relates to apparatus for use as a borescope and in particular to an orbital scanning borescope. Such borescopes are commonly used for inspection of gas turbine engines to determine if there are any cracks or defects in components such as turbine blades. It is known in this field to incorporate a reticle (or graticule) in the borescope which allows a user to estimate the size of a crack or defect which is viewed through the scope, in order to determine whether the engine is airworthy.

Typically, these reticles have been fixed in the borescope in two ways. Firstly, the reticle may be fixed in position in relation to the handle/control section of the proximal end of the borescope. This means that when a borescope is orbitally scanned the reticle does not rotate with the image but stays in a fixed orientation. Secondly, the reticle may be fixed in relation to the insertion tube containing the lens system. In this version, when the borescope is orbitally scanned, the reticle always rotates with the image.

Both of these approaches present certain problems in that it may not be possible to correctly align the reticle with the feature to be measured, making the measurement far more difficult.

SUMMARY OF THE INVENTION

Accordingly, the present invention provides apparatus for use as a borescope comprising a tube having a distal end which is insertable in use into an inaccessible location and a proximal end connected to a housing, a viewing port adjacent the distal end and an associated reflector through which an object at the inaccessible location may be laterally viewed in use, an image relaying means operable to relay an image of the object to a viewing means provided in the housing, an image inverter operable to correct image inversion created by the reflector, a scanning means operable to rotate the reflector relative to the housing about a rotation axis extending longitudinally of the tube, and focusing means operable to adjust the position of the viewing means relative to the housing in a direction along an optical axis defined by the viewing means, wherein the viewing means comprises an ocular lens received in an ocular mount, said ocular mount being supported by said housing so as to be axially movable with respect to said reflector and to be rotatable relative to the housing and the tube, the apparatus further comprising reticle means secured to the ocular mount at a location distal to the ocular lens and alignment means operable to rotate the ocular mount with the ocular lens and the reticle means relative to the tube.

An advantage of such apparatus is that the reticle can be rotated independently of the rotation of the tube and reflector. Therefore, the reflector can be scanned to allow a particular feature to be viewed and the reticle can then be aligned with the feature at the correct orientation to allow the feature to be measured.

Preferably, the focusing means comprises a focus actuator operable to provide adjustment along the optical axis of the position of the ocular mount relative to the housing.

Conveniently, the ocular mount is slidably received in a tubular portion of the housing, the focus actuator comprises a first collar rotatably mounted on the tubular portion, and the alignment means comprises a second collar secured to the tubular portion, the apparatus further comprising a coupling mechanism operable to axially displace the ocular mount in response to rotation of the first collar and to rotate the ocular mount in response to rotation of the second collar.

The coupling mechanism may comprise a ball bearing located in an axially extending slot defined by the tubular portion of the housing, the ball bearing projecting radially inwardly and outwardly of the tubular portion into respective engagement with a circular recess formed in a cylindrical surface of the ocular mount and a helical groove formed in the first collar.

Preferably, the scanning means is operable to rotate the tube relative to the housing such that the rotation axis of the tube is collinear with the optical axis of the viewing means.

Typically, the image relaying means comprises an optical relay having a plurality of lenses spaced axially within the tube.

In addition, the image inverter may comprise a dove prism.

BRIEF DESCRIPTION OF THE DRAWINGS

A preferred embodiment of the present invention will now be described, by way of example only, with reference to the accompanying drawing FIG. 1, which is a longitudinal section of a borescope in accordance with the present invention.

DETAILED DESCRIPTION OF THE INVENTION

In FIG. 1, a borescope 1 comprises a tube 2 having a distal end 3 and a proximal end 4 received within a housing or chassis 5.

A side viewing in port 6 is provided at the distal end 3 of the tube 2 and a prismatic reflector 7 is located adjacent the viewing port 6 so as to reflect light from a laterally located object in the general direction of a longitudinal axis 8 defined by the tube 2. The tube 2 contains axially spaced relay lenses 9 which together comprise an optical relay operable to relay an image of an object being viewed through the tube 2 to a viewing means 10 within the housing 5.

The viewing means 10 includes an ocular lens 11 mounted in a cylindrical ocular mount 12 and further includes an eyepiece assembly 13.

A dove prism 14 is mounted within the tube 2 in order to correct image inversion resulting from reflection by the reflector 7.

The tube 2 is contained within a tubular shaft 15 within which it is eccentrically located to accommodate a fiber optic bundle 16 of crescent shaped cross section which conducts light from a light guide connector 17 to an illumination port 18 adjacent the distal end 3. Light emerging from the illumination port 18 is thereby available to illuminate an object to be viewed. The shaft 15 has a relatively narrow external diameter thereby making it suitable for insertion into inaccessible areas.

The tube 2 extends coaxially through a bearing 24 of the housing 5 and is connected to a tubular connecting member 20 which forms a proximally projecting extension to the tube 2.

The connecting member 20 is slidably received within a tubular chassis rear portion 21 at the proximal end of the housing 5. The ocular mount 12 is similarly received as a sliding fit within the chassis rear portion 21 such that the ocular lens 11 is spaced proximally from the connecting member 20. The ocular mount 12 projects distally so as to extend to a small extent into the connecting member 20. The ocular mount 12 is rotatable relative to the connecting member 20.

The tubular shaft 15 is mounted in the bearing 24 by means of a bush 22. The bearing 24 is secured within a distally projecting end portion of the housing 5 and captively retained therein by a locking ring 25. A scanning actuator 26 is mounted on the distal end of the housing 5, with a flexible plastic ring 19 therebetween, and is manually rotatable relative thereto.

The orbital scanning actuator 26 is connected to the bearing 24 by means of a projection 27 located within a co-operating recess or slot 28 in the bearing 24. The outer surface of the scanning actuator 26 may be provided with one or more indentations 23 to help a user grip the actuator 26, and a projection 29 may be provided to indicate the angular orientation of the actuator 26. A ball bearing 30 may be fitted between the bearing 24 and the housing 5 to aid smooth rotation and also to limit angular rotation of the actuator 26.

The tubular shaft 15 is thus received in the bearing 24 in a manner which prevents axial movement of the tube 2 relative to the housing 5 but which allows rotational movement of the tube 2 about the longitudinal axis 8 in response to a user turning the scanning actuator 26.

The focusing of the borescope 1 is accommodated by means of turning an annular collar 32 which is rotatably mounted on the tubular chassis rear portion 21 at the proximal end of the housing S. The collar 32 is coupled to the ocular mount 12 in a manner which converts rotational movement of the collar 32 into axial movement of the ocular mount 12 along a direction coincident with an ocular axis defined by the ocular lens 11.

This coupling is achieved by means of a ball bearing 34 received within an axially extending slot 35 formed in the chassis rear portion 21. The ball bearing 34 has a diameter greater than the radial thickness of the chassis rear portion 21 so as to project radially inwardly into engagement with a circular recess 36 formed in the ocular mount 12 and radially outwardly into engagement with a helical groove 37 formed in a sleeve 38 secured to the focus collar 32.

The collar 32 and ocular mount 12 are thereby keyed together by the co-operating ball bearing 34, recess 36 and helical groove 37. When the collar 32 and thus the sleeve 38 are rotated the ball bearing 34, which is constrained to lie at a fixed azimuthal position relative to the optical axis by virtue of the slot 35, is compelled to move axially to an extent defined by the pitch of the helical groove 37. This axial displacement causes corresponding axial movement of the ocular mount 12 to which the ball bearing 34 is keyed via the recess 36.

A reticle 40 is located in the distal end of the ocular mount 12. Rotation of the ocular mount 12 and thus the reticle 40 is achieved by means of a second collar 41 and the tubular portion 21.

The second collar 41 is rotatably mounted adjacent the proximal end of the housing S. Its position axially is fixed by locating the collar 41 between the end of the housing 5 and the focus collar 32. The second collar 41 is secured, for example by a thread 43, to the tubular chassis rear portion 21 so that the two parts can rotate together. The tubular chassis rear portion 21 is fixed in position axially between a locking ring 44 and a shoulder 45 on the housing 5. However, the tubular chassis rear portion 21 is rotatable relative to both the housing 5 and the connecting member 20.

When the second collar 41 is rotated, the chassis rear portion 21 and the entire proximal end of the borescope, including the eyepiece assembly 13 and the ball bearing 34, rotates with it due to friction between the various parts. Since the ball bearing 34 is seated in the recess 36 it keys together the sleeve 38 and the ocular mount 12 and therefore also causes the ocular mount 12 to rotate. In this way, rotation of the collar 41 causes rotation of the reticle 40.

In operation of the borescope, the tubular shaft 15 is inserted into a device to be inspected, eg a gas turbine engine, and the scanning actuator 26 is rotated until a desired part of the engine can be viewed through the scope. An image of the desired component is then brought into focus by rotating the focus collar 32 so as to move the ocular mount 12 and ocular lens 11 axially. Thereafter, the second collar 41 is rotated in order to rotate the reticle 40 until it is appropriately lined up with the feature to be measured. Rotation of the collar 41 causes the ocular mount 12 to rotate but not to move axially and therefore the image stays in focus whilst the reticle 40 is aligned as appropriate.

Thus, the present invention provides an improved borescope for use in applications where it is necessary to compare visual images obtained through a scope with a predefined reticle, allowing the reticle to be aligned with the image to facilitate the comparison. An example of image comparison may be size indication but the invention is not limited to this application. It will be apparent to those skilled in the art that a number of modifications can be made to the precise details and construction of the borescope described whilst still falling within the scope of the claims.

What is claimed is:

1. Apparatus for use as a borescope comprising:
   a tube having a distal end which is insertable in use into an inaccessible location and a proximal end connected to a housing,
   a viewing port adjacent the distal end and an associated reflector through which an object at the inaccessible location is laterally viewed in use,
   an image relaying means operable to relay an image of the object to a viewing means provided in the housing,
   an image inverter operable to correct image inversion created by the reflector,
   a scanning means operable to rotate the reflector relative to the housing about a rotation axis extending longitudinally of the tube, and
   focusing means operable to move the viewing means relative to the housing along an optical axis defined by the viewing means,
   wherein the viewing means comprises an ocular lens received in an ocular mount, said ocular mount being supported by said housing so as to be axially movable with respect to said reflector and to be rotatable relative to the housing and the tube,
   the apparatus further comprising reticle means secured to the ocular mount at a location distal to the ocular lens and alignment means operable to rotate the ocular mount with the ocular lens and the reticle means relative to the tube.

2. Apparatus as claimed in claim 1, wherein the focusing means comprises a focus actuator operable to provide positional adjustment along the optical axis of the ocular mount relative to the housing.

3. Apparatus as claimed in claim 2, wherein the ocular mount is slidably received in a tubular portion of the housing, the focus actuator comprises a first collar rotatably mounted on the tubular portion, and the alignment means comprises a second collar rotatable mounted with respect to the housing, the apparatus further comprising a coupling mechanism operable to axially displace the ocular mount in response to rotation of the first collar and to rotate the ocular mount in response to rotation of the second collar.

4. Apparatus as claimed in claim 3, wherein the coupling mechanism for axially displacing the ocular mount comprises a ball bearing located in an axially extending slot defined by the tubular portion of the housing, the ball bearing projecting radially inwardly and outwardly of the tubular portion into respective engagement with a circular recess formed in a cylindrical surface of the ocular mount and a helical groove formed in a sleeve which is secured to the first collar.

5. Apparatus as claimed in claim 1 wherein the scanning means is operable to rotate the tube relative to the housing such that the rotation axis of the tube is collinear with the optical axis of the viewing means.

6. Apparatus as claimed in claim 1, wherein the image relaying means comprises an optical relay having a plurality of lenses spaced axially within the tube.

7. Apparatus as claimed in claim 1, wherein the image inverter comprises a dove prism.

8. Apparatus as claimed in claim 1, wherein the ocular mount is slidably received in a tubular portion, the focusing means comprises a first collar rotatably mounted on the tubular portion, and the alignment means comprises a second collar secured to the tubular portion, the apparatus further comprising a coupling mechanism operable to axially displace the ocular mount in response to rotation of the first collar and to rotate the ocular mount in response to rotation of the second collar.

9. Apparatus as claimed in claim 8, wherein the coupling mechanism for axially displacing the ocular mount comprises a ball-bearing located in an axially extending slot defined by the tubular portion of the housing, the ball-bearing projecting radially inwardly and outwardly of the tubular portion into respective engagement with a circular recess formed in a cylindrical surface of the ocular mount and a helical groove formed in a sleeve which is secured to the first collar.

10. Apparatus for use as a borescope comprising:
 a tube having a distal end which is insertable in use into an inaccessible location and a proximal end connected to a housing,
 a viewing port adjacent the distal end and an associated reflector through which an object at the inaccessible location is laterally viewed in use,
 an image relaying means operable to relay an image of the object to a viewing means provided in the housing,
 an image inverter operable to correct image inversion created by the reflector,
 a scanning means operable to rotate the reflector relative to the housing about a rotation axis extending longitudinally of the tube, and
 focusing means operable to move the viewing means relative to the housing along an optical axis defined by the viewing means,
 wherein the viewing means comprises an ocular lens received in an ocular mount, said ocular mount being supported by said housing so as to be axially movable with respect to said reflector and to be rotatable relative to the housing and the tube,
 the apparatus further comprising reticle means located distally of the ocular lens and rotatable relative to the tube, and alignment means operable to rotate the ocular mount with the ocular lens and the reticle means relative to the tube.

11. Apparatus as claimed in claim 10, wherein the focusing means comprises a focus actuator operable to provide positional adjustment along the optical axis of the ocular mount relative to the housing.

12. Apparatus as claimed in claim 11, wherein the ocular mount is slidably received in a tubular portion of the housing, the focus actuator comprises a first collar rotatably mounted on the tubular portion, and the alignment means comprises a second collar rotatably mounted with respect to the housing, the apparatus further comprising a coupling mechanism operable to axially displace the ocular mount in response to rotation of the first collar and to rotate the ocular mount in response to rotation of the second collar.

13. Apparatus as claimed in claim 12, wherein the coupling mechanism for axially displacing the ocular mount comprises a ball bearing located in an axially extending slot defined by the tubular portion of the housing, the ball bearing projecting radially inwardly and outwardly of the tubular portion into respective engagement with a circular recess formed in a cylindrical surface of the ocular mount and a helical groove formed in a sleeve which is secured to the first collar.

14. Apparatus as claimed in claim 10, wherein the ocular mount is slidably received in a tubular portion, the focusing means comprises a first collar rotatably mounted on the tubular portion, and the alignment means comprises a second collar secured to the tubular portion, the apparatus further comprising a coupling mechanism operable to axially displace the ocular mount in response to rotation of the first collar and to rotate the ocular mount in response to rotation of the second collar.

15. Apparatus as claimed in claim 14, wherein the coupling mechanism for axially displacing the ocular mount comprises a ball-bearing located in an axially extending slot defined by the tubular portion of the housing, the ball-bearing projecting radially inwardly and outwardly of the tubular portion into respective engagement with a circular recess formed in a cylindrical surface of the ocular mount and a helical groove formed in a sleeve which is secured to the first collar.

\* \* \* \* \*

UNITED STATES PATENT AND TRADEMARK OFFICE
CERTIFICATE OF CORRECTION

PATENT NO. : 6,333,812 B1
DATED : December 25, 2001
INVENTOR(S) : Rose et al.

It is certified that error appears in the above-identified patent and that said Letters Patent is hereby corrected as shown below:

<u>Title page,</u>
Change Item [86] PCT No.:
Please change "PCT/GB97/03665" to -- PCT/GB98/03665 --.

Signed and Sealed this

Nineteenth Day of March, 2002

Attest:

JAMES E. ROGAN
Attesting Officer
Director of the United States Patent and Trademark Office